United States Patent
Ross

(10) Patent No.: US 12,175,550 B2
(45) Date of Patent: *Dec. 24, 2024

(54) ENHANCED TEACHING METHOD AND SECURITY PROTOCOL IN TESTING STUDENTS

(71) Applicant: Peter Ross, San Francisco, CA (US)

(72) Inventor: Peter Ross, San Francisco, CA (US)

(73) Assignee: Edu AI Blockchain Solutions LLC, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,120

(22) Filed: Apr. 27, 2023

(65) Prior Publication Data

US 2023/0260065 A1  Aug. 17, 2023

Related U.S. Application Data

(63) Continuation of application No. 16/041,588, filed on Jul. 20, 2018, now Pat. No. 11,669,923.

(Continued)

(51) Int. Cl.
*G06Q 10/00* (2023.01)
*G06F 21/32* (2013.01)
(Continued)

(52) U.S. Cl.
CPC ......... *G06Q 50/2053* (2013.01); *G06F 21/32* (2013.01); *G06Q 10/10* (2013.01); *G09B 7/07* (2013.01); *H04L 67/306* (2013.01)

(58) Field of Classification Search
CPC .......................... G06Q 50/2053; H04L 67/306
See application file for complete search history.

(56) References Cited

U.S. PATENT DOCUMENTS 10,854,101 B1  12/2020  Iftikhar
2006/0088806 A1  4/2006  Quinn
(Continued)

FOREIGN PATENT DOCUMENTS

JP  2005084176 A  3/2005
KR  20020037267 A  4/2005

OTHER PUBLICATIONS

Stewart, John Cary. ("An Evaluation of the Application of Stylometry and the Keystroke Biometric to Identify Verification of Online Test-Takers". Pace University. ProQuest Dissertations Publishing, 2013.): (Year: 2013).*

(Continued)

*Primary Examiner* — Gabrielle A McCormick
(74) *Attorney, Agent, or Firm* — Haverstock & Owens, A Law Corporation

(57) ABSTRACT

A secure education system including a secure education application, an education content database and a student profile database having a plurality of student profiles that include identification data that identifies a person associated with the student profile and evaluation data that valuates an academic proficiency of the person. The application both providing and dynamically adjusting the educational content based on an associated student profile of a user as well as securely determining the identity of the user in order to validate interactions of the user with the educational content. The verified identity and academic proficiency of a person can be compiled into an academic profile and submitted to academic institutions to support the user as a candidate for admissions.

26 Claims, 3 Drawing Sheets

Related U.S. Application Data

(60) Provisional application No. 62/535,174, filed on Jul. 20, 2017.

(51) Int. Cl.
*G06Q 10/10* (2023.01)
*G06Q 50/20* (2012.01)
*G09B 7/07* (2006.01)
*H04L 67/306* (2022.01)

(56) References Cited

U.S. PATENT DOCUMENTS

| | | |
|---|---|---|
| 2009/0089135 A1 | 4/2009 | Minert et al. |
| 2009/0280464 A1 | 11/2009 | Corn et al. |
| 2013/0227402 A1 | 8/2013 | Rossen-Knill et al. |
| 2015/0066672 A1 | 3/2015 | Swamynathan et al. |
| 2016/0030834 A1 | 2/2016 | Brown et al. |
| 2016/0275804 A1* | 9/2016 | Koppel ............... G09B 5/12 |
| 2018/0212890 A1 | 7/2018 | Yan |
| 2018/0253496 A1 | 9/2018 | Natchu |
| 2018/0270537 A1 | 9/2018 | Erikkson et al. |

OTHER PUBLICATIONS

International Preliminary Report for International Application No. PCT/US2018/43159 dated Jan. 30, 2020.
International Search Report and Written Opinion for International Application No. PCT/US18/43159.

* cited by examiner

ENHANCED TEACHING METHOD AND SECURITY PROTOCOL IN TESTING STUDENTS

RELATED APPLICATIONS

This application is a continuation application of the co-pending U.S. application Ser. No. 16/041,588, filed Jul. 20, 2018, titled "ENHANCED TEACHING METHOD AND SECURITY PROTOCOL IN TESTING STUDENTS", which claims priority under 35 U.S.C. § 119 (e) of the U.S. provisional patent application Ser. No. 62/535,174 filed Jul. 20, 2017, and titled "ENHANCED TEACHING METHOD AND SECURITY PROTOCOL IN TESTING STUDENTS," which are both hereby incorporated by reference.

FIELD OF THE INVENTION

The present invention relates to the field of student testing and verification. More particularly, the present invention relates to a method, system and device for providing verifiable student profiles and testing results for admissions.

BACKGROUND OF THE INVENTION

Currently the industry of student recruitment faces many issues involving the agents who are paid to help students internationally apply and get admitted to middle schools, high schools, universities, and other educational organizations. Because of the fees demanded by these agents, they will do anything required to get a student admitted into a program or school even committing fraud.

The testing entities use recycled questions which allow college preparation companies to provide their students with question answers before the test is administered. Even having one correct answer before taking one of these tests can boost a score 10 to 20 points. In general students will have many more than just one question answer. It's been reported that students enrolled in test-preparation schools in Asia were given a booklet that was essentially an answer key, i.e. words from correct responses to multiple-choice questions that had appeared on past tests—many answers which would be used again in the exam this student was taking because of the routine practice of reusing material from tests that already have been given. This enabled some students to get perfect scores on the tests. When the testing entities decided to update the test to hopefully address some of these concerns, the new test was available online to the entire world within 24 hours of first being administered within the United States. Tipsters have provided evidence that entire contents of tests have been stolen and photographed. The testing entities have acknowledged widespread problems with test security in Asia in recent years and since October 2014, the New York-based organization has delayed issuing scores in Asia at least six times and canceled an exam sitting in two locations there—steps taken when there is evidence that test material has been exposed to the public. In addition, there have been numerous incidents where test material was circulating online before the test was administered overseas. Because of the extent of the security breaches, admissions officers have no idea which of those foreign test-takers saw material in advance.

The new exam leaves in place the biggest fundamental weakness plaguing the old exam: the recycling of test material. And that reuse of test material has proved to be a major security hole. Security breaches abroad are increasingly significant for U.S. higher education because schools are allocating more seats than ever to foreign students. About a third of the 761,000 degree-seeking foreign students in America come from China, according to the Institute of International Education. Overseas students are especially attractive because most don't qualify for financial aid and thus pay full price.

The two largest test preparation/agency companies in the world had employees come forward to the press to discuss the rampant fraud that is committed within these organizations. The fraud occurs on multiple levels with systematic approaches. For college preparation packages ranging between the price of $1,000-$50,000, employees will write college essays, and even forge historical transcripts for students to do everything possible to give them a competitive advantage to get them into different programs. Several methods of obtaining testing material have been reported. Cram schools and students will corroborate and photograph images of a test. Sometimes test takers steal test booklets once the exam is over. Then the information is distributed online or through other test prep services. Again, the reuse of test material has proved to be a major security hole.

Recently the fraud is becoming much more sophisticated as prospective students hire persons/impostors who forge complete fake identities to take entrance exams while posing as the student applying to a program. This not only occurs abroad in South Korea, Saudi Arabia, and China, but it now occurs in the United States as well. Near perfect copies of passports are created to have standardized testing experts enter into legitimate testing centers to take the test for the students applying to the school programs.

Test preparation companies have moved away from actually teaching students the necessary materials to legitimately pass the test and instead just teach students tricks that help them pass the test without any mastery of the material. Students can score 110 out of 120 on the tests without even being able to speak basic conversational English. Schools and Colleges have no other way to evaluate students besides the information they are provided in applications so it is impossible for them to actually properly gauge a student's abilities or proficiency before accepting them into programs.

One strategy that schools and universities faced with continuously increasing and unsustainable operational costs is to admit international students who pay full tuition and do not receive any financial aid. The manifestation of the possible fraud outlined above is acceptance of hundreds of thousands of unqualified applicants that arrive at their programs and barely speak English and perform very badly. Because of misaligned incentives and a blatant disregard of immorality of fraudulent behavior, these companies are outsmarting admissions officers which have no resources or tools to help determine which are the legitimate candidates from illegitimate candidates. Thousands of students that actually reside in the United States are seriously disadvantaged when competing against professional test-takers and potentially near perfect false historical transcripts. The testing entities and their security contractors acknowledge this rampant fraud but do very little to prevent it. More importantly, because of cost implications, they have refused to implement the one solution that would directly address the main cause of the problem, and that is to continuously create new versions of the tests instead of reusing the tests.

SUMMARY OF THE INVENTION

A secure education system including a secure education application, an education content database and a student profile database having a plurality of student profiles that include identification data that identifies a person associated with the student profile and evaluation data that valuates an academic proficiency of the person. The application both providing and dynamically adjusting the educational content based on an associated student profile of a user as well as securely determining the identity of the user in order to validate interactions of the user with the educational content.

A first aspect is directed to a secure education system. The system comprises a non-transitory computer readable education content database including a plurality of portions of educational content including tests and lessons on a plurality of subjects, a non-transitory computer readable student profile database including a plurality of student profiles that include identification data that identifies a person associated with the student profile and evaluation data that valuates an academic proficiency of the person in at least one of the plurality of subjects and a computing device having a non-transitory computer readable memory storing a secure education application, the application providing one or more of the plurality of portions of educational content to a user on the computing device, wherein the application dynamically determines which of the plurality of the portions to provide and an order in which the one or more of the plurality of portions are provided based on one of the student profiles that is associated with the user.

In some embodiments, the application dynamically determines which of the plurality of the portions to provide and the order in which the one or more of the plurality of portions are provided based on values of the one of the student profiles that indicate at least one of a frequency of use of the application by the user over a predetermined period, an average duration of continuous use of the application over a predetermined period, or an amount of time since the application was last used by the user. In some embodiments, the application updates the student profile of the user on the student profile database based on interactions of the user with the educational content including interview data, soft skill data, answers to questions within the educational content submitted by the user, and text documents written by the user. In some embodiments, the application determines if the user is associated with the one of the student profiles based on a biometric value of the user input by the computing device, wherein the biometric value comprises one or more of the group consisting of a fingerprint, a voice sample and a facial image. In some embodiments, the application determines if a submitted text document is likely written by the user based on one or more writing characteristic values of the one of the student profiles associated with the user and corresponding values of the submitted text document.

In some embodiments, the application refrains from updating the student profile of the user based on at least one of the interactions when either the application determines that the user is not associated with the one of the student profiles or the application determines that the one of the interactions is the submitted text document that the submitted text document is not likely written by the user. In some embodiments, the application updates the student profile of the user based on at least one of the interactions even if the application is unable to determine that the user is associated with the one of the student profiles as long as the application also determines that the one of the interactions is the submitted text document that the submitted text document is likely written by the user. In some embodiments, the application automatically transmits a portion of the student profile of the user to an educational institution upon request by the user, enables the educational institution to submit a received text document to the application and determines if the received text document is likely written by the user, wherein the portion includes an entire verified education profile of the user. In some embodiments, the evaluation data includes classroom interactions of the user and a teacher, samples of assignments, course grades, text documents created by the user, interview videos demonstrating speaking proficiency of the user, test scores, soft skills valuations, language proficiency values and personality characteristics of the user. In some embodiments, the identification data includes one or more of a government identification card, a fingerprint of the user, a voice sample file of the user and a facial image of the user.

A second aspect is directed to a secure education device. The device comprises a processor, a display, a non-transitory computer readable memory including an education content database having a plurality of portions of educational content including tests and lessons on a plurality of subjects, and a student profile database having a plurality of student profiles that include identification data that identifies a person associated with the student profile and evaluation data that valuates an academic proficiency of the person in at least one of the plurality of subjects and a secure education application stored on the non-transitory computer readable memory, the application providing one or more of the plurality of portions of educational content to a user on the display, wherein the application dynamically determines which of the plurality of the portions to provide and an order in which the one or more of the plurality of portions are provided based on one of the student profiles that is associated with the user.

In some embodiments, the application dynamically determines which of the plurality of the portions to provide and the order in which the one or more of the plurality of portions are provided based on values of the one of the student profiles that indicate at least one of a frequency of use of the application by the user over a predetermined period, an average duration of continuous use of the application over a predetermined period, or an amount of time since the application was last used by the user. In some embodiments, the application updates the student profile of the user on the student profile database based on interactions of the user with the educational content including interview data, soft skill data, answers to questions within the educational content submitted by the user, and text documents written by the user. In some embodiments, the application determines if the user is associated with the one of the student profiles based on a biometric value of the user input by input hardware of the device, wherein the biometric value comprises one or more of the group consisting of a fingerprint, a voice sample and a facial image. In some embodiments, the application determines if a submitted text document is likely written by the user based on one or more writing characteristic values of the one of the student profiles associated with the user and corresponding values of the submitted text document.

In some embodiments, the application refrains from updating the student profile of the user based on at least one of the interactions when either the application determines that the user is not associated with the one of the student profiles or the application determines that the one of the interactions is the submitted text document that the submitted text document is not likely written by the user. In some embodiments, the application updates the student profile of the user based on at least one of the interactions even if the application is unable to determine that the user is associated with the one of the student profiles as long as the application also determines that the one of the interactions is the submitted text document that the submitted text document is likely written by the user. In some embodiments, the application automatically transmits a portion of the student profile of the user to an educational institution upon request by the user, enables the educational institution to submit a received text document to the application and determines if the received text document is likely written by the user, wherein the portion includes an entire verified education profile of the user. In some embodiments, the evaluation data includes classroom interactions of the user and a teacher, samples of assignments, course grades, text documents created by the user, interview videos demonstrating speaking proficiency of the user, test scores, soft skills valuations, language proficiency values and personality characteristics of the user. In some embodiments, the identification data includes one or more of a government identification card, a fingerprint of the user, a voice sample file of the user and a facial image of the user.

A third aspect is directed to a method of providing a secure education system. The method comprises maintaining an education content database having a plurality of portions of educational content including tests and lessons on a plurality of subjects on a memory of a server, generating a student profile database on the non-transitory computer readable medium, the student profile database having a plurality of student profiles that include identification data that identifies a person associated with the student profile and evaluation data that valuates an academic proficiency of the person in at least one of the plurality of subjects and providing, with a secure education application, one or more of the plurality of portions of educational content to a user on a display of a computing device storing the application, wherein the providing comprises dynamically determining which of the plurality of the portions to provide and an order in which the one or more of the plurality of portions are provided based on one of the student profiles that is associated with the user.

In some embodiments, the method further comprises dynamically determining with the application which of the plurality of the portions to provide and the order in which the one or more of the plurality of portions are provided based on values of the one of the student profiles that indicate at least one of a frequency of use of the application by the user over a predetermined period, an average duration of continuous use of the application over a predetermined period, or an amount of time since the application was last used by the user. In some embodiments, the method further comprises updating the student profile of the user on the student profile database with the application based on interactions of the user with the educational content including interview data, soft skill data, answers to questions within the educational content submitted by the user, and text documents written by the user. In some embodiments, the method further comprises determining if the user is associated with the one of the student profiles with the application based on a biometric value of the user input by input hardware of the device, wherein the biometric value comprises one or more of the group consisting of a fingerprint, a voice sample and a facial image. In some embodiments, the method further comprises determining if a submitted text document is likely written by the user with the application based on one or more writing characteristic values of the one of the student profiles associated with the user and corresponding values of the submitted text document.

In some embodiments, the method further comprises refraining from updating the student profile of the user with the application based on at least one of the interactions when either the application determines that the user is not associated with the one of the student profiles or the application determines that the one of the interactions is the submitted text document that the submitted text document is not likely written by the user. In some embodiments, the method further comprises updating the student profile of the user with the application based on at least one of the interactions even if the application is unable to determine that the user is associated with the one of the student profiles as long as the application also determines that the one of the interactions is the submitted text document that the submitted text document is likely written by the user. In some embodiments, the method further comprises automatically transmitting a portion of the student profile of the user to an educational institution with the application upon request by the user, enabling the educational institution to submit a received text document to the application and determining if the received text document is likely written by the user, wherein the portion includes an entire verified education profile of the user. In some embodiments, the evaluation data includes classroom interactions of the user and a teacher, samples of assignments, course grades, text documents created by the user, interview videos demonstrating speaking proficiency of the user, test scores, soft skills valuations, language proficiency values and personality characteristics of the user. In some embodiments, the identification data includes one or more of a government identification card, a fingerprint of the user, a voice sample file of the user and a facial image of the user. In some embodiments, the educational content comprises accredited courses for one or more of science, mathematics, engineering and humanities. In some embodiments, the submitted text document is an admissions essay.

DETAILED DESCRIPTION OF THE INVENTION

Embodiments described herein are directed to a secure education system including a secure education application, an education content database and a student profile database having a plurality of student profiles that include identification data that identifies a person associated with the student profile and evaluation data that valuates (e.g. assigns a value to) an academic proficiency of the person. The application both providing and dynamically adjusting the educational content based on an associated student profile of a user as well as securely determining the identity of the user in order to validate interactions of the user with the educational content. As a result, the system provides the advantage of creating and maintaining an authenticated set of student profiles that accurately identify and describe the (educational and personality) characteristics/achievements of the associated students. Further, the system provides the benefits of enabling third parties to independently verify the authenticity of submitted application data when determining admissions or other processes, authenticating the submitted data itself (separate from or in conjunction with the identification of the user via the other functions described above), and enabling a user to learn the subject matter in the shortest amount of time without sacrificing understanding of the material.

Figure 1:
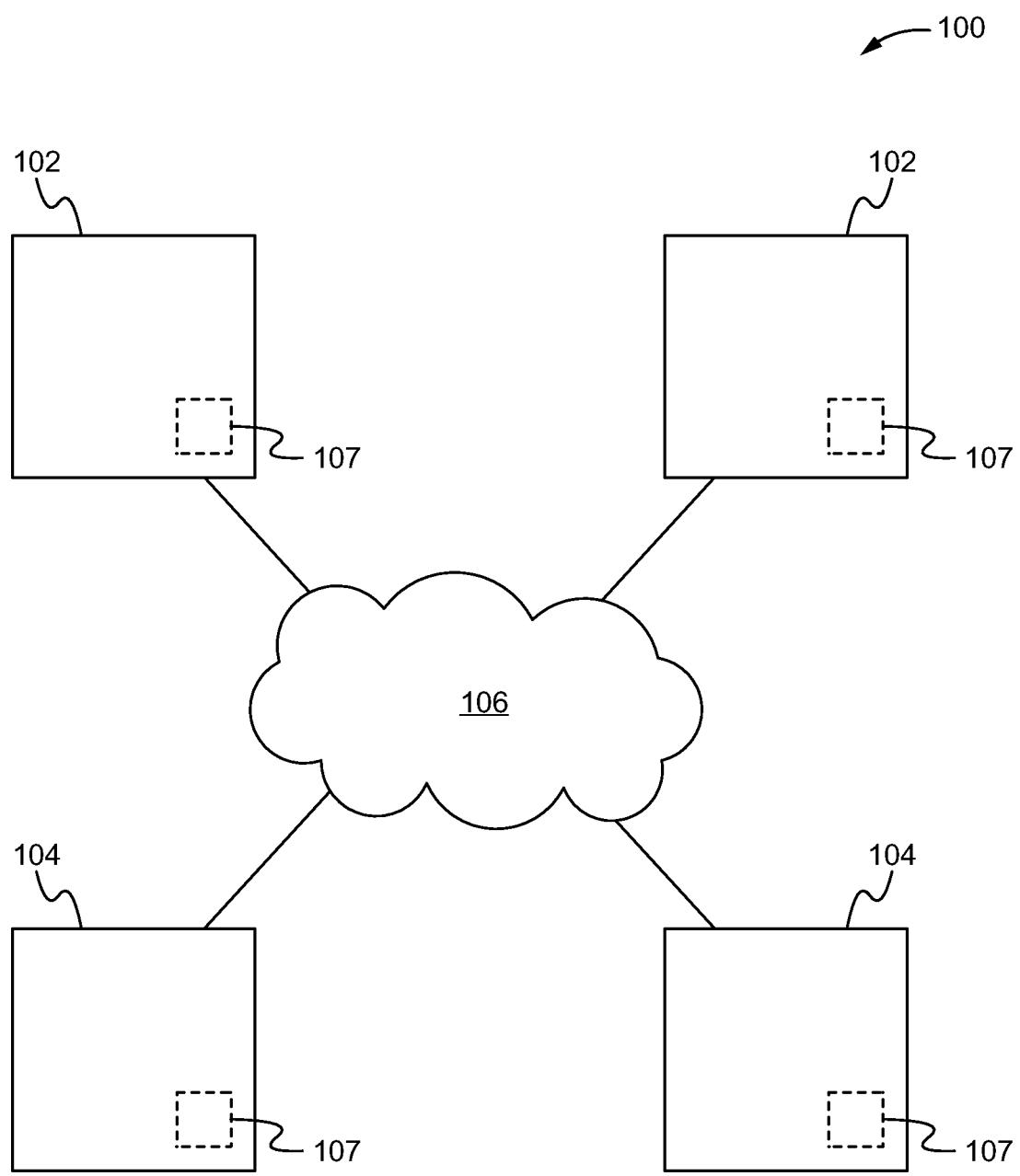
FIG. 1 illustrates a secure education system according to some embodiments.

FIG. 1 illustrates a secure education system 100 according to some embodiments. As shown in FIG. 1, the system 100 comprises one or more computing devices 102 and one or more servers 104 communicatively coupled via one or more networks 106. Although as shown in FIG. 1, two servers 104 are coupled with two devices 102, it is understood that any number of servers 104 are able to be coupled with any number of devices 102. The networks 106 are able to be one or a combination of wired or wireless networks as are well known in the art. The one or more servers 104 are able to store at least a portion of a secure education agent and/or application 107 including a graphic user interface on a memory of one or more of the servers 104. As a result, a user is able to download the application 107 from the servers 104 over the network 106 onto one or more of the devices 102. After being downloaded to the device 102, the application 107 is able to create and use an application database within the local memory on the device 102 to store and utilize data necessary for operation.

Alternatively, some or all of the data is able to be stored in a server database on the memory on the servers 104 such that the application 107 is able to connect to the servers 104 over the networks 106 in order to utilize the data on the server database. For example, the locally executing application 107 on the devices 102 is able to remotely communicate with the servers 104 over the network 106 to perform any features of the application 107 and/or access any data on the server database not available with just the data on the device 102. In some embodiments, the same data is stored on both the server database and one or more of the devices 102 such that either local or remote data access is possible. In such embodiments, the data on the servers 104 and/or devices 102 is able to be synchronized by the application 107. In some embodiments, the server database and/or application 107 is distributed across a plurality of the servers 104. Alternatively or in addition, one or more of the servers 104 are able to store all of the database and/or application data. In such embodiments, the servers 104 are able to perform a synchronization process such that all the databases and/or other application data are synchronized.

Alternatively, the application 107 is able to be replaced or supplemented with an item agent and/or website stored on the server memory and executed by the servers 104, wherein the agent and/or website provides some or all of the functionality of the application 107 with a website user interface that is substantially similar to the application user interface. In such embodiments, a device 102 is able to access the agent and/or website and utilize the features of the agent and/or website with a web browser that communicates with the servers 104 over the networks 106. In some embodiments, the functionality of the website is able to be limited to facilitating the downloading of the application 107 onto one or more devices 102. In other words, the application/agent 107 is able to operate on just the servers 104, just the devices 102 or a combination of the servers 104 and devices 102. Accordingly, it should be noted that although described according to an exemplary functional distribution herein, other distributions of the functions of the application/agent 107 between the servers 104 (via the agent/website) and the devices 102 (via the application) are contemplated but not included for the sake of brevity. In such embodiments, the application 107 is able to be already installed in the device 102 or is able to be part of the software or firmware operating the device 102 itself (e.g. a device that is dedicated to the functions of the application 107).

The operational data stored on the computing devices 102, the servers 104 or a combination thereof is able to comprise an educational content database and a student profile database. In some embodiments, the educational content database is stored on one or more first servers 104 (and/or devices 102) and the student profile database is stored on one or more second servers 104 (and/or devices 102), wherein the first servers 104 (and/or the application 107) perform the educational content functions (e.g. education module) described herein and the second servers 104 (and/or the application 107) perform the profile and/or identity functions (e.g. profile module and/or identity verification module) described herein. The educational content database is able to comprise lessons (e.g. accredited courses), educational textbooks, tests, quizzes, homework, activities, videos, audio and/or other educational content directed to educational subjects such as, but not limited to, humanities, computer science, language arts, reading, mathematics, science, writing and other subjects generally used in education admissions processes. For example, the educational content is able to include content related to the SAT/ACT, AP/SAT2, TOEFL/IELTS, GRE/GMAT, TOEFL Jr., SSAT and other courses of different levels (e.g. accredited courses in science, mathematics, humanities, computer science, engineering or english). The student profile database is able to comprise one or more student profiles that identify a student associated with the system 100 and that include one or more characteristics associated with the student that either further identify the student and/or indicate the proficiency of the student in one or more educational subjects such as those found in the educational content database and/or other subjects (e.g. soft skills (e.g. communication abilities, public speaking, critical thinking, leadership, etc.), attention span, creativity, attentiveness and/or introverted or extrovertedness, etc.).

For example, one or more of the student profiles are able to comprise interview data describing interviews with the student (e.g. demeanor, English proficiency, etc.), past testing scores (e.g. score values and/or questions/subtopics correctly/incorrectly answered), past written documents (e.g. written test/quiz/homework answers and/or essays, grammatical/semantic patterns, punctuation, word usage (types/vocabulary used and/or frequency), sentence/paragraph structure, length and/or quantity, language used, subjects and/or other written document data), biometric/identification data (e.g. fingerprints, voice recognition data (e.g. speaking samples, patterns, cadence), writing recognition data (e.g. patterns, word usage/frequency, paragraph/sentence length, quantity, grammar and/or other writing recognition data) and/or facial recognition data (e.g. facial images/characteristics such as hair, skin, mouth, eye, nose, ear spacing, color, etc.). The student profile data is able to be determined based on past data submitted to and/or remotely accessed by the application 107 (e.g. prior test scores and/or written documents from other institutions, identification data, interviews or other data), and/or interactions by the student with the application 107 (e.g. student's testing, homework and other scores using the application 107, interviews, written answers/essays via the application 107 and/or frequency and/or duration of use of the application 107). As a result, the educational content database and the student profile database are able to be used by the application 107 to provide the features of the system 100 described herein.

The computing devices 102 are able to be any computing device having a memory for storing at least a portion of the application 107, a network interface for communicating over the network 106, an input/output interface for communicating with a user or one or more peripheral (e.g. display, touchscreen, keyboard or other interfaces) and/or hardware/software capable of performing one or more biometric functions such as fingerprint verification (e.g. touchpad/fingerprint scanner), voice recognition (e.g. microphone) and/or facial recognition (e.g. camera). Examples of suitable computing devices 102 include smart jewelry (e.g., smartwatch), a personal computer, a laptop computer, a computer workstation, a server, a mainframe computer, a handheld computer, a personal digital assistant, a cellular/mobile telephone, a smart appliance, a game console, a camera phone, a smart phone, a portable music player, a tablet computer, a mobile device, a television, a home entertainment system or other suitable computing device.

The application 107 is able to comprise a user interface and an education module, a profile module and an identity verification module, wherein the application 107 and the modules use the application database to store, maintain and access data necessary for the operation of the modules of the application 107. The profile module is able to populate and maintain the student profile database by creating, associating and storing data (as described herein) for one or more student profiles. Specifically, each account on the application 107 (e.g. as created by the login and registration module described below) is able to have one or more student profiles associated with users of the account. Once the student profiles are created (e.g. based on initial information such as the results of a placement test, an initial interview, and/or existing grades/scores/papers imported from outside sources), the profile module is able to monitor student interactions with the application 107 and/or data about the student from outside sources (e.g. other educational institutional electronic records, manually entered data by application administrators, and/or other data sources) and add that data to the student profile.

In particular, the data is able to include identification data (e.g. biometric data, official records) that is then able to be used to verify whether future monitored data is authentic and should be added to the profile. For example, before adding a test score or a writing sample to a student profile, the profile module is able to require the submission of one or more identification criteria from the user in order to prove that they are the person associated with the student profile. As described herein, the identification criteria is able to comprise fingerprint recognition, voice recognition, facial recognition and/or password/login information. Further, even if one or more of the identification criteria is met, the profile module is able to compare the data (e.g. test results, writing sample) to the data that is already a part of the student profile to determine the likelihood of whether it is valid. In particular, a submitted writing sample is able to be compared to statistics derived from other writing samples associated with the profile (e.g. sentence/paragraph length, vocabulary used, grammatical structure, language, total length, and/or other characteristics) and if the likelihood of the submitted sample being produced by the same person as the existing other writing samples is below a threshold value, the profile module is able to refrain from associating the submitted sample.

Thus, in some embodiments the profile module is able to utilize a two part authentication requirement wherein both the identity of the person submitting the data as well as the data itself is able to be verified before the data is added to the student profile. Alternatively, only one of the authentication requirements (e.g. identification of the person or validation of the submitted data) is able to be required to be met for the profile module to associated the data with the student profile. Alternatively, in some embodiments if either of the two parts is satisfied the profile module is able to add the data to the student profile. For example, if the user is able to satisfactorily identify themselves or the data is able to be satisfactorily authenticated based on existing data (even if the other part is unable to be satisfied), the profile module is able to add the data to the student profile. Further, the combination of authentication required for association is able to depend on the type of data being submitted. For example, if the data is submitted/input by the user (e.g. by taking a test, submitting an assignment, completing an activity on the application 107 and/or uploading/typing a writing sample to/on the application 107) one or both requirements are able to be used whereas if the data is observational data (e.g. attentiveness, participation level, enthusiasm level) and/or if the data is submitted by a trusted source (e.g. application administrator, education institution and/or other trusted source) only one or none of the requirements are able to be used. In some embodiments, instead of the profile module performing the validation functions described above, the identity verification module performs the verification functions described above such that the profile module is able to simply determine whether to add data to a student profile based on the results of the identity verification module. Thus, the profile module provides the advantage of creating and maintaining an authenticated set of student profiles that accurately identify and describe the (educational and personality) characteristics/achievements of the associated students.

The education module is able to provide and dynamically adjust education content to one or more users of the application 107 when they sign into the their accounts on the application 107. Specifically, for a plurality of subjects (e.g. math, science, history, reading, language arts, interviewing, essay writing, resume writing and/or other subjects), the education module is able to provide (e.g. in different format types such as visual, audio and/or textual, including asynchronous learning or live/real-time video, or live text messaging or live immersive learning) one or more of lessons, activities, homework, quizzes, tests and/or assignments (e.g. requests for written papers) and provide grades, scores, suggestions, annotations, comments and/or other valuations for the users progress in those subjects (which are able to be added to the student profile for that user by the profile module). Further, the education module is able to enable a user to create custom goals (e.g. scores, grades and/or progress timelines) for one or more of the subjects and will automatically monitory the user's progress toward those goals. For example, the module enables a user to select and/or modify goals of a grade of B or higher for a history paper, a 90% grade in a geometry subject by a target date, a number of consecutive days (or percentage of a period of days or a duration each day) that the user makes progress toward completing a curriculum or interacting with the education module and/or completion of a Spanish level 1 class curriculum by a target date. Then, once the goals are submitted to the module, the education module tracks progress toward those goals (e.g percentage complete, current number of consecutive days, current grade, etc.) and enables the user to view that progress.

Moreover, the education module is able to suggest and/or require course progressions through one or more of the subjects based on the student profile of the user (e.g. based on the grades and/or other valuations (e.g. the results of a placement test provided by the application 107), data added/entered by trusted sources and/or data imported from other sources (e.g. prior grades/studies)). In particular, the education module is able to dynamically adjust the sequence of the content (e.g. changing the order of portions, skipping/omitting portions and/or repeating/emphasizing portions) one or more portions of the content based on the student profile in order to maximize the effectiveness of the user's use of the module. In some embodiments, the education module presents a user with an initial placement test, and based on the results of that test (and/or the initial associated student profile which can incorporate the results of the placement test), the module determines an initial sequence/set of portions of the content designed for the user (that can then be dynamically adjusted as the user progresses through the initial sequence/set). As a result, the education module enables a user to learn the subject matter in the shortest amount of time without sacrificing understanding of the material.

The identity verification module is able to verify the identity of a user of the application 107 and/or the authenticity of data submitted by a user (e.g. answers to test/activity/quiz questions and/or papers/essays/text documents). Specifically, the identity verification module is able to comprise one or more of a fingerprint recognition function, a voice recognition function and/or a facial recognition function to determine if a user is associated with one of the student profiles, and is able to comprise one or more of a writing authenticity function and/or a score authenticity function to determine if submitted data (e.g. test scores/papers) is likely (above a threshold value) to have been produced by a user associated with a selected student profile (e.g. based on similarities/differences between characteristics of the submitted data and existing data associated with the profile).

The fingerprint recognition function is able to request an initial fingerprint scan upon registration of a new user (e.g. via the login and registration module) and then compare one or more fingerprints scanned by the device 102 to the stored fingerprints associated with a student profile to see if they match above a threshold level. Similarly, the voice recognition function is able to request an initial voice input (e.g. reading of one or more phrases/words displayed by the device 102) upon registration of a new user (e.g. via the login and registration module) and then compare one or more audio samples input by the device 102 (e.g. as a file or via a microphone of the device 102) to the stored audio samples associated with a student profile to see if they match above a threshold level. Also similarly, the facial recognition function is able to request initial facial/image input (e.g. prompting to look at cameras of the device 102 and scanning of the face by the device 102) upon registration of a new user (e.g. via the login and registration module) and then compare one or more facial samples/images input by the device 102 (e.g. as a file or via a camera of the device 102) to the stored facial images/samples associated with a student profile to see if they match above a threshold level.

The writing authenticity function is able to request one or more initial writing samples from a user (e.g. via prompting the user to submit the samples via the user interface of the application/device) and/or analyze one or more writing samples created by the user that are able to be imported from a trusted source (e.g. an education institution website) upon registration of a new user (e.g. via the login and registration module). The writing authenticity function is then compare one or more submitted documents/writings input to the device 102 (e.g. as a file or via a user interface of the device 102) to the analysis/statistics derived from the writing samples associated with a student profile to see if the submitted documents are sufficiently similar to the writing samples (above a threshold) to indicate that they are likely written by the user associated with the student profile. For example, the writing authenticity function is able to analyze the sample writings to determine characteristics such as vocabulary used, punctuation uses, sentence structure, grammar, sentence length, paragraph length, document length and/or other characteristics and then compare those values to the corresponding values of the submitted documents (as determined by the function).

Similarly, the score authenticity function is able to analyze the scores/results produced/submitted by users either as a part of the education module or as separate files from other institutions. Specifically, the score authenticity function is able to analyze existing data associated with the student profile (e.g prior scores to particular questions, entire subjects and/or sub-topics; and/or the initial values of those scores, the progression/rate of change in those scores over time and/or the most recent values of those scores for those questions/subjects/sub-topics) and then compare one or more scores input to the device 102 (e.g. as a file or via interaction with the education module using the user interface of the device 102) to the analysis/statistics derived from the existing data associated with a student profile to see if the submitted scores are sufficiently similar to the existing data (above a similarity/likelihood threshold) to indicate that they are likely generated by the user associated with the student profile. For example, if the scores are within a threshold (e.g. 90% or one standard deviation) of previous scores related to the subject/question/sub-topics based on the rate of change in scores, how recent the prior scores are and/or a difference (e.g. a number of standard deviations) between the submitted scores and one or more of the prior scores (or an average thereof), the submitted scores/results are able to be authenticated by the score authenticity function. As a result, the score and writing authenticity functions are able to provide the benefit of authenticating the submitted data itself (separate from or in conjunction with the identification of the user via the other functions described above). Additionally, although as described herein many of the samples are requested/acquired upon registration, it is noted that one or more of the samples are able to be requested/acquired after or before the registration has occurred such that they are added to an existing student profile or to a new student profile once it is created.

Accordingly, the identity verification module is able to be used by the application 107 to determine what results/data should be added to a student profile (e.g. is it authentic) and/or whether to provide access to the education module or other modules (e.g. does the user have permission to use those portions of the application). Additionally, in some embodiments the identity verification module is able to provide third parties (e.g. education institutions) the ability to submit papers and/or scores received from an individual to the application 107 (e.g via the server 104), wherein the module is able to verify whether those submitted papers and/or scores should be associated with a particular student profile and the user associated therewith (in the manner described above). Thus, the identity verification module provides the added benefit of enabling third parties to independently verify the authenticity of submitted application data when determining admissions or other processes.

Additionally, in some embodiments the application is able to comprise a login and registration module and submission module, wherein the application user interface is configured to enable users to utilize the application modules. The login and registration module enables a user to create a user profile/account by inputting username and password information via the graphical user interface that is then associated with the account and student profile such that the information is able to be used to identify the user when logging onto the application. In particular, this information is able to include one or more of the verification information described above with respect to the verification module. Alternatively, the login information is able to be omitted and a user is able to use the application 107 without creating a user account or logging in. After a user account is created, the user is able to access the account by entering the username and password (and/or other verification information) in order to identify themselves to the application 107. In some embodiments, during the creation of the account or subsequently, additional information is able to be stored and associated with the account such as, but not limited to, contact information (e.g. phone number, email, address), submitted content (e.g. item images, descriptions), account privileges/subscription information (e.g. unlocked application features), friends or other trusted accounts on the system and payment information. In some embodiments, the additional information is submitted by a user upon logging into the account. Alternatively, some or all of the additional information is able to be applied to the account automatically by the application based on interactions by the user with the application.

The submission module enables a user to select one or more institutions from a list of available institutions stored by the application 107 for submission of an application for the student profile associated with the user for joining that institution. In particular, in some embodiments the submission module is able to prompt the user for any necessary application information that is missing, incorrect or incomplete, prompt the user for upcoming application deadlines, and/or automatically provide the required application data to the selected institution by the deadlines via the network 106 based on the student profile and provide verification services for that institution for that student profile (e.g. to verify any independent test results (e.g. using the verification module as described above)). For example, the module is able to provide an entire student transcript or performance evaluation in one or more accredited courses, wherein the grades/scores of the transcript/evaluation are verified by the application 107 as described above. In some embodiments, the submission module provides a key (e.g. login) along with the application data that enables the institution to verify any papers and/or scores for the user/student profile using the application 107 (e.g. the identity verification module as described above). As a result, the application 107 is able to automatically submit one or more applications for the user as well as provide authentication functions to the institutions for verifying those applications.

Figure 2:
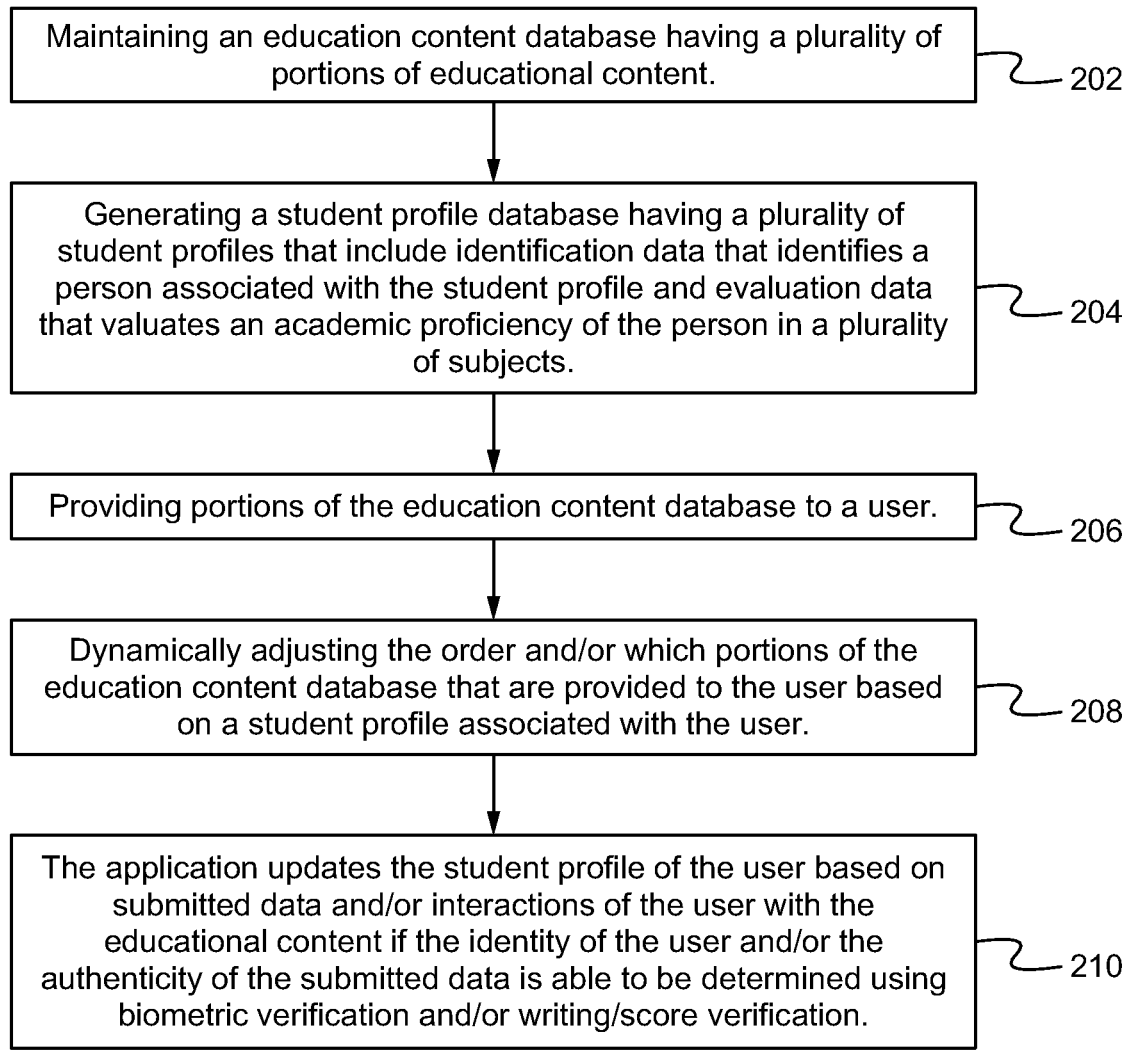
FIG. 2 illustrates a method of providing secure education system according to some embodiments.

FIG. 2 illustrates a method of providing secure education system 100 according to some embodiments. As shown in FIG. 2, the application 107 maintains an education content database having a plurality of portions of educational content including tests and lessons on a plurality of subjects on a memory of a server 104 at the step 202. The application 107 generates a student profile database having a plurality of student profiles that include identification data that identifies a person associated with the student profile and evaluation data that valuates an academic proficiency of the person in at least one of the plurality of subjects at the step 204. The application 107 provides one or more of the plurality of portions of educational content to a user on a display of a computing device 102 at the step 206. The application 107 dynamically adjusting the order and/or which portions of the education content database that are provided to the user based on a student profile associated with the user at the step 208. The application 107 updates the student profile of the user based on submitted data and/or interactions of the user with the educational content (e.g. standardized tests, educational work for classes) if the identity of the user and/or the authenticity of the submitted data is able to be determined using biometric verification and/or writing/score verification at the step 210.

In some embodiments, the interactions comprise answers to questions within the educational content submitted by the user to the application 107 and/or the submitted data comprises text documents written by the user or test scores/answers for test taken separate from the application 107. In some embodiments, the biometric verification comprises determining if the user is associated with the one of the student profiles with the application 107 based on a biometric value of the user input by input hardware of the device 102, wherein the biometric value comprises one or more of the group consisting of a fingerprint, a voice sample and a facial image. In some embodiments, the biometric verification is able to be supplemented with other verification methods such as submission of a username and password, answers to security questions, social security numbers, government identification (e.g. driver's license, passport, etc.) which can be compared to stored data to determine if the submitted data is accurate and therefore identifies the submitting user as the user associated with the student profile (that includes the stored data to which the submitted data is compared).

In some embodiments, the method further comprises dynamically determining with the application 107 which of the plurality of the portions to provide and the order in which the one or more of the plurality of portions are provided based on values of the one of the student profiles that indicate at least one of a frequency of use of the application 107 by the user over a predetermined period, an average duration of continuous use of the application 107 over a predetermined period, or an amount of time since the application 107 was last used by the user.

In some embodiments, the method further comprises determining if a submitted text document is likely written by the user with the application 107 based on one or more writing characteristic values of the one of the student profiles associated with the user and corresponding values of the submitted text document. In some embodiments, the method further comprises refraining from updating the student profile of the user with the application 107 based on at least one of the interactions when either the application 107 determines that the user is not associated with the one of the student profiles or the application 107 determines that the one of the interactions is the submitted text document that the submitted text document is not likely written by the user. In some embodiments, the method further comprises updating the student profile of the user with the application 107 based on at least one of the interactions even if the application 107 is unable to determine that the user is associated with the one of the student profiles as long as the application 107 also determines that the one of the interactions is the submitted text document that the submitted text document is likely written by the user. In some embodiments, the method further comprises automatically transmitting a portion of the student profile of the user to an educational institution with the application 107 upon request by the user, enabling the educational institution to submit a received text document to the application 107 and determining if the received text document is likely written by the user.

Figure 3:
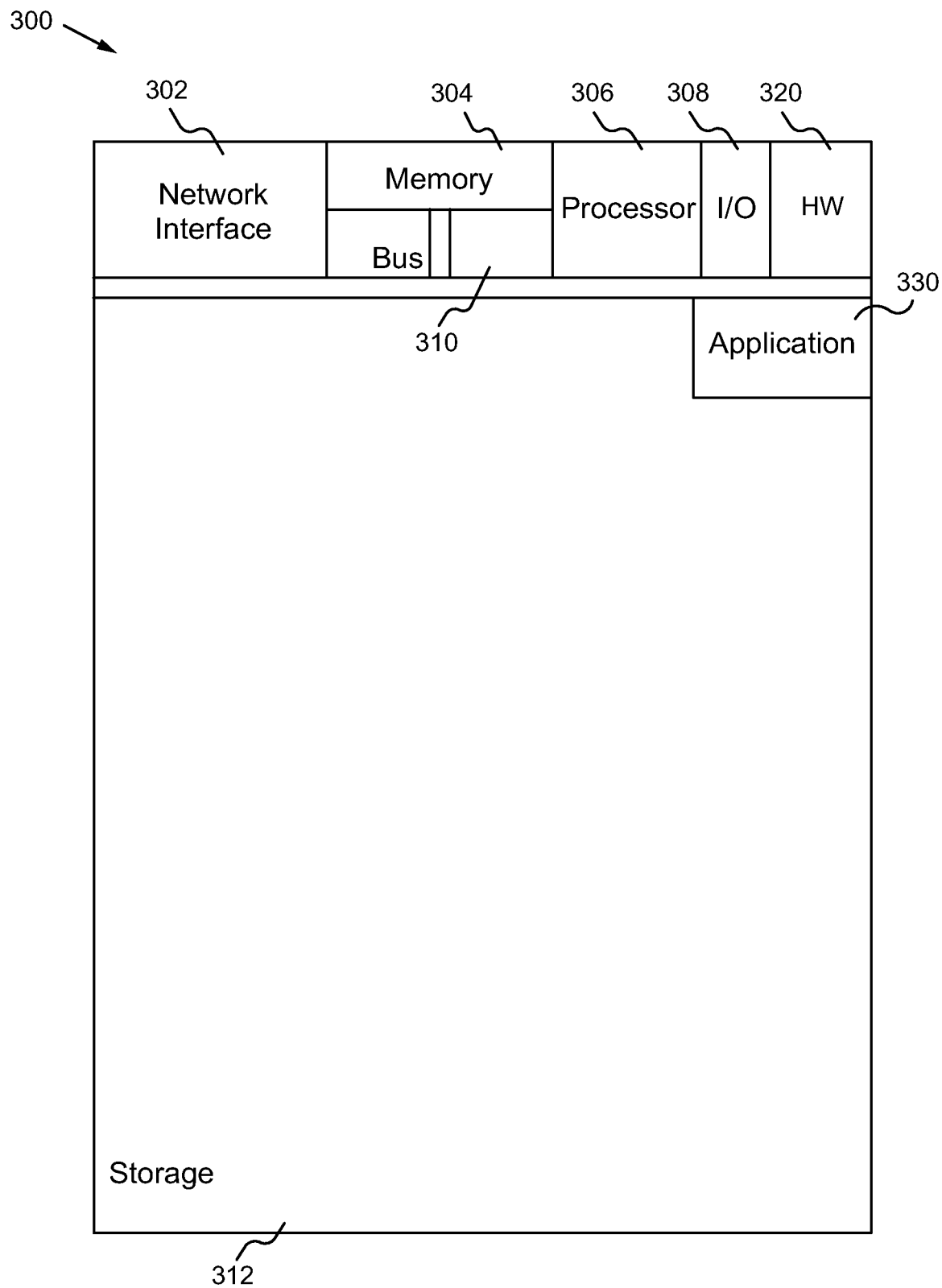
FIG. 3 illustrates block diagram of an exemplary computing device configured to implement the system according to some embodiments.

FIG. 3 illustrates a block diagram of an exemplary computing device 300 configured to implement the system 100 according to some embodiments. In addition to the features described above, the computing devices 102 and/or servers 104 are able to be substantially similar to the device 300. In general, a hardware structure suitable for implementing the computing device 300 includes a network interface 302, a memory 304, a processor 306, I/O device(s) 308, a bus 310 and a storage device 312. Alternatively, one or more of the illustrated components are able to be removed or substituted for other components well known in the art. The choice of processor is not critical as long as a suitable processor with sufficient speed is chosen. The memory 304 is able to be any conventional computer memory known in the art. The storage device 312 is able to include a hard drive, CDROM, CDRW, DVD, DVDRW, flash memory card or any other storage device. The computing device 300 is able to include one or more network interfaces 302. An example of a network interface includes a network card connected to an Ethernet or other type of LAN. The I/O device(s) 308 are able to include one or more of the following: keyboard, mouse, monitor, display, printer, modem, touchscreen, button interface and other devices. Authentication system application 107 or module(s) thereof are likely to be stored in the storage device 312 and memory 304 and processed as applications are typically processed. More or fewer components shown in FIG. 3 are able to be included in the computing device 300. In some embodiments, system hardware 320 is included. Although the computing device 300 in FIG. 3 includes applications/modules 330 and hardware 320 for the system 100, the system 100 is able to be implemented on a computing device in hardware, firmware, software or any combination thereof.

Accordingly, the system 100 comprises numerous benefits. Specifically, the system provides the benefits of enabling third parties to independently verify the authenticity of submitted application data when determining admissions or other processes, authenticating the submitted data itself (separate from or in conjunction with the identification of the user via the other functions described above), and enabling a user to learn the subject matter in the shortest amount of time without sacrificing understanding of the material.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A secure education system, the system comprising:
 a non-transitory computer readable education content database including a plurality of portions of educational content on one or more subjects;
 a non-transitory computer readable student profile database including one or more student profiles that include identification data that identifies a user associated with one of the student profiles and evaluation data that valuates a proficiency of the user in at least one of the subjects; and
 a computing device having a processor and a non-transitory computer readable memory storing a secure education application, wherein when executing the application, the processor:
 determines if a submitted text document is likely authored by the user based on one or more writing characteristic values of the student profile associated with the user by comparing the writing characteristics values to values of the submitted text document;
 electronically tracks an amount of time since the application was last used on the device by the user; and
 electronically provides one or more of the plurality of portions of educational content in an order on the computing device, the one or more of the plurality of portions and the order in which the one or more of the plurality of portions are provided being based on the amount of time since the application was last used on the device by the user.

2. The system of claim 1, wherein the application updates the student profile of the user on the student profile database based on interactions of the user with the educational content including interview data, soft skill data, answers to questions within the educational content submitted by the user, and text documents written by the user.

3. The system of claim 2, wherein the application determines if the user is associated with the one of the student profiles based on a biometric value of the user input by the computing device, wherein the biometric value comprises one or more of the group consisting of a fingerprint, a voice sample and a facial image.

4. The system of claim 3, wherein the application refrains from updating the student profile of the user based on at least one of the interactions when either the application determines that the user is not associated with the one of the student profiles or the application determines that the one of the interactions is the submitted text document that the submitted text document is not likely written by the user.

5. The system of claim 4, wherein the application updates the student profile of the user based on at least one of the interactions even if the application is unable to determine that the user is associated with the one of the student profiles as long as the application also determines that the one of the interactions is the submitted text document that the submitted text document is likely written by the user.

6. The system of claim 5, wherein the application automatically transmits a portion of the student profile of the user to an educational institution upon request by the user, enables the educational institution to submit a received text document to the application and determines if the received text document is likely written by the user, wherein the portion includes an entire verified education profile of the user.

7. The system of claim 6, wherein the evaluation data includes classroom interactions of the user and a teacher, samples of assignments, course grades, text documents created by the user, interview videos demonstrating speaking proficiency of the user, test scores, soft skills valuations, language proficiency values and personality characteristics of the user.

8. The system of claim 7, wherein the identification data includes one or more of a government identification card, a fingerprint of the user, a voice sample file of the user and a facial image of the user.

9. A secure education device, the device comprising:
- a processor;
- a display;
- a non-transitory computer readable memory including an education content database having a plurality of portions of educational content on one or more subjects, and a student profile database having one or more student profiles that include identification data that identifies a user associated with the student profile and evaluation data that valuates a proficiency of the user in at least one of the subjects; and
- a secure education application stored on the non-transitory computer readable memory, wherein when executing the application, the processor:
- determines if a submitted text document is likely authored by the user based on one or more writing characteristic values of the student profile associated with the user by comparing the writing characteristics values to values of the submitted text document
- electronically tracks an amount of time since the application was last used on the device by the user; and
- electrically provides one or more of the plurality of portions of educational content in an order to a user on the display, the one or more of the plurality of portions and the order in which the one or more of the plurality of portions are provided being based on the amount of time since the application was last used on the device by the user.

10. The device of claim 9, wherein the application updates the student profile of the user on the student profile database based on interactions of the user with the educational content including interview data, soft skill data, answers to questions within the educational content submitted by the user, and text documents written by the user.

11. The device of claim 10, wherein the application determines if the user is associated with the one of the student profiles based on a biometric value of the user input by input hardware of the device, wherein the biometric value comprises one or more of the group consisting of a fingerprint, a voice sample and a facial image.

12. The device of claim 11, wherein the application refrains from updating the student profile of the user based on at least one of the interactions when either the application determines that the user is not associated with the one of the student profiles or the application determines that the one of the interactions is the submitted text document that the submitted text document is not likely written by the user.

13. The device of claim 12, wherein the application updates the student profile of the user based on at least one of the interactions even if the application is unable to determine that the user is associated with the one of the student profiles as long as the application also determines that the one of the interactions is the submitted text document that the submitted text document is likely written by the user.

14. The device of claim 13, wherein the application automatically transmits a portion of the student profile of the user to an educational institution upon request by the user, enables the educational institution to submit a received text document to the application and determines if the received text document is likely written by the user, wherein the portion includes an entire verified education profile of the user.

15. The device of claim 14, wherein the evaluation data includes classroom interactions of the user and a teacher, samples of assignments, course grades, text documents created by the user, interview videos demonstrating speaking proficiency of the user, test scores, soft skills valuations, language proficiency values and personality characteristics of the user.

16. The device of claim 15, wherein the identification data includes one or more of a government identification card, a fingerprint of the user, a voice sample file of the user and a facial image of the user.

17. A method of providing a secure education system, the method comprising:
- maintaining an education content database having a plurality of portions of educational content on one or more subjects on a memory of a server;
- generating a student profile database on the non-transitory computer readable medium, the student profile database having one or more student profiles that include identification data that identifies a user associated with the student profile and evaluation data that valuates a proficiency of the user in at least one of the subjects;
- determining, with a secure education application, if a submitted text document is likely authored by the user based on one or more writing characteristic values of the student profile associated with the user by comparing the writing characteristics values to values of the submitted text document;
- electronically tracking, with the secure education application, an amount of time since the application was last used on the device by the user; and
- electronically providing, with the secure education application, one or more of the plurality of portions of educational content in order on a computing device, the one or more of the plurality of portions and the order in which the one or more of the plurality of portions are provided being based on the amount of time since the application was last used on the computing device by the user.

18. The method of claim 17, further comprising updating the student profile of the user on the student profile database with the application based on interactions of the user with the educational content including interview data, soft skill data, answers to questions within the educational content submitted by the user, and text documents written by the user.

19. The method of claim 18, further comprising determining if the user is associated with the one of the student profiles with the application based on a biometric value of the user input by input hardware of the device, wherein the biometric value comprises one or more of the group consisting of a fingerprint, a voice sample and a facial image.

20. The method of claim 19, further comprising refraining from updating the student profile of the user with the application based on at least one of the interactions when either the application determines that the user is not associated with the one of the student profiles or the application determines that the one of the interactions is the submitted text document that the submitted text document is not likely written by the user.

21. The method of claim 20, further comprising updating the student profile of the user with the application based on at least one of the interactions even if the application is unable to determine that the user is associated with the one of the student profiles as long as the application also determines that the one of the interactions is the submitted text document that the submitted text document is likely written by the user.

22. The method of claim 21, further comprising automatically transmitting a portion of the student profile of the user to an educational institution with the application upon request by the user, enabling the educational institution to submit a received text document to the application and determining if the received text document is likely written by the user, wherein the portion includes an entire verified education profile of the user.

23. The method of claim 22, wherein the evaluation data includes classroom interactions of the user and a teacher, samples of assignments, course grades, text documents created by the user, interview videos demonstrating speaking proficiency of the user, test scores, soft skills valuations, language proficiency values and personality characteristics of the user.

24. The method of claim 23, wherein the identification data includes one or more of a government identification card, a fingerprint of the user, a voice sample file of the user and a facial image of the user.

25. The method of claim 24, wherein the educational content comprises accredited courses for one or more of science, mathematics, engineering and humanities.

26. The method of claim 25, wherein the submitted text document is an admissions essay.

* * * * *